United States Patent [19]

Whiteley et al.

[11] Patent Number: 4,795,597
[45] Date of Patent: Jan. 3, 1989

[54] MANUFACTURE OF MOULDED PLASTICS ARTICLES

[75] Inventors: Norman Whiteley, Walsall; Paul J. H. Bagnall, Admaston, Near Rugeley; Karl Longbottom, Burton-on-Trent, all of England

[73] Assignee: Peerless Plastics Packaging Limited, Coton Farm Industrial Estate, United Kingdom

[21] Appl. No.: 57,384

[22] Filed: Jun. 2, 1987

[30] Foreign Application Priority Data

Jun. 11, 1986 [GB] United Kingdom ............... 8614164
Oct. 23, 1986 [GB] United Kingdom ............... 8625384

[51] Int. Cl.$^4$ .............. B29C 45/14; B29C 31/08; B29C 45/40; B06B 1/00
[52] U.S. Cl. .............. 264/22; 264/153; 264/509; 264/511; 264/259; 425/126.1; 425/444
[58] Field of Search ............ 264/22, 509, 511, 516, 264/153, 163, 246, 259, 247; 425/444, 126.1

[56] References Cited

U.S. PATENT DOCUMENTS

| | | | |
|---|---|---|---|
| 3,511,902 | 5/1970 | Santangelo | 264/251 X |
| 3,608,020 | 9/1971 | Langecker | 264/153 X |
| 4,076,790 | 2/1978 | Lind | 264/247 X |
| 4,571,320 | 2/1986 | Walker | 425/444 X |

FOREIGN PATENT DOCUMENTS 61-14913 1/1986 Japan ................................ 264/22

OTHER PUBLICATIONS

Neumann, Hubert G., "In-Mold Decoration", Modern Plastics Encyclopedia, vol. 52, No. 10A, 1975-76, p. 448.

Primary Examiner—Jan H. Silbaugh
Assistant Examiner—Yun H. Wang

[57] ABSTRACT

A moulded plastics article, such as a container, having a blank of a plastics film material, as a label or diffusion barrier, at a surface thereof is manufactured by a method including the steps of cutting blanks individually from a strip of the plastics film material for each moulding operation, and feeding each cut blank to and introducing it into the mould ready for the respective moulding operation to be performed in which the blank becomes incorporated in the moulded article. The blank may be located in the mould by suction and/or blown air applied at the mould, or by electrostatically charging the blank to cause it to be attracted to a surface in the mould. The cut blanks are taken individually to the mould by a transfer arm which holds them by suction.

10 Claims, 1 Drawing Sheet

MANUFACTURE OF MOULDED PLASTICS ARTICLES

This invention relates to improvements in the manufacture of moulded plastics articles which have a blank of sheet material, which may for example be a label and/or serve as a diffusion barrier, incorporated in them as they are moulded.

Hitherto the sheet material of which the blank has been made has generally been coated paper, board, plastics sheet, foil or a composition material which has sufficient body to enable it to retain a flat, or substantially flat, form whilst it is being handled prior to insertion in the mould in which the moulded plastics article is to be made. Because it is able to retain its form it can be handled relatively easily, it can be stacked with others, and readily separated from the stack, in readiness for use, and it may be delivered to the mould by such means as a chute or rollers.

There are now available plastics films which have improved resistance to water vapour and air penetration, and in some examples resistance to passage through them of ultra violet rays, and to wear by scuffing. Such films may be used to advantage in moulded plastics containers for foodstuffs, for example, as diffusion barriers to protect the contents from deterioration. At least in respect of containers of rectangular, cylindrical and other relatively simple shapes, the films may be applied to provide full cover over internal or external surfaces of the bodies and/or lids of the containers, so as to provide diffusion barriers which are as effective as possible. Furthermore, when incorporated into the molded plastics articles the films virtually become integral with the plastics of the articles and hence may be regarded as permanent parts of the articles, unlike blanks of paper, board or foil.

The plastics films just described have certain disadvantages which make it difficult to handle blanks made of the films for use in the manufacture of moulded plastics articles in the ways in which blanks of paper, board or foil have usually been handled hitherto. Blanks made from the plastics films are flimsy and if they are stacked in readiness for use they tend to cling together and are then difficult to separate for use. Even if they can be separated, because of the tendency to cling there is the probability that as a blank is removed from a stack it will cause other blanks in the stack to be disturbed. This disturbance is undesirable especially when the blanks are to be collected and transferred automatically from the stack to the mould, because it can become impossible for the disturbed blanks to be maneuvered correctly for accurate location in the mould. Accurate location is desirable where the blanks are to serve as labels in the moulded plastics articles, and is normally essential where the blanks are to provide diffusion barriers in order for the barrriers to be effective. As the blanks are filmsy they may also be unable by themselves to retain a flat, or generally flat, form and they may curl or roll over upon themselves, which adds to the difficulty in handling them. Furthermore, as the plastics films are highly prone to becoming charged with static electricity, for some applications of the films the handling has had to be carried out in a controlled atmosphere.

According to the present invention there is provided a method of manufacturing moulded plastics articles having blanks of a plastics film material applied at surfaces thereof as the articles are moulded, which includes the steps of feeding a strip of the plastics film to cutting means by which the blanks are cut from the strip individually for each moulding operation, and as each blank is cut from the strip it is fed to and introduced into the mould for the respective moulding operation to be performed.

As the blands are cut from the strip individually as they are required for use in the moulding operation, there is not the problem of storing them until they are required to be used. Also as they are cut individually and fed individually from the strip to the mould there is no risk of blanks coming into contact with one another and clinging together. That problem in supplying the blanks to the mould is therefore avoided as well.

Transfer means may be provided which takes the cut blanks from the cutting means to the mould. The cutting means may include a component which holds each blank a sit is cut from the strip and which is then movable to a position at which the blank is picked up by transfer means, for example a robotic arm, and transferred to the mould. The component may provide a bed on which the strip is supported as it is cut.

Suction may be applied to the blanks at the transfer means to hold them in place on the transfer means as they are taken to the mould. Suction may be applied to the blank at the component. Suction and/or blown air may be applied to the blanks at the mould to locate them in the mould.

As another manner of locating the cut blanks in the mould, static electricity may be used. Each blank may be electrostatically charged when it reaches a position in which it can be introduced into the mould. The charged blank is attracted to an adjacent surface of one mould half on which it is required to be located for the subsequent moulding operation. An advantage of this manner of locating the blanks is that with an appropriate electrical charge a blank can be readily located on flat mould surfaces and surfaces including bends and/or curves, and around corners.

A suitable device may be carried by the transfer means for electrostatically charging the blanks to cause them to be attracted to the one mould half as they are released by the transfer means.

The cutting means may comprises a die or stamping plate having a cutting edge defining the required shape of the blanks, and which is impressed on the strip, or against which the strip is pressed, for example by a pressure plate or roller, to cut the blanks from the strip.

Preferably the strip is fed from a reel to the cutting means. From the cutting means the surplus of the strip left after the blanks have been cut from the strip may be wound on to another reel for disposal. The strip is conveniently drawn off the first-mentioned reel intermittently, sufficient at a time for a blank to be cut from the strip.

The operations of cutting of the strip by the cutting means to provide each blank and the feeding of the blank to the mould are preferably performed automatically in association with opening and closing sequences of the mould. Thus the blank may be cut from the strip just before or as the mould is opened, and a moulded plastics article is ejected from the mould if there has been a previous moulding operation, and the blank may be transferred to the mould and located in position in the mould as the mould is in the process of opening, thereby reducing delays between moulding operations.

The blanks used in the process according to the invention may be of various shapes and may partially extend over external or internal surfaces of the moulded plastics articles, or extend entirely, or substantially entirely, over external or internal surfaces of the articles, as required.

An embodiment of the invention will be described now by way of example with reference to the accompanying drawings in which.

Figure 4:
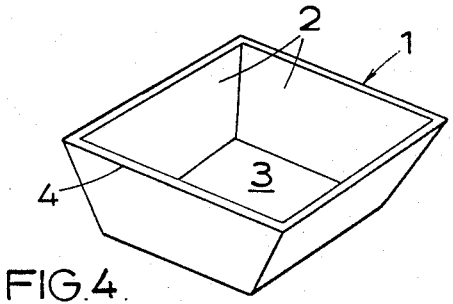
FIG. 4 is a perspective view of a moulded plastics article manufactured by the process.

In this embodiment of the invention the process to be described is applied to the manufacture from a thermoplastics material, for example a low density polyethylene, of rectangular, open-topped, containers 1, as shown in FIG. 4. Such a container 1 has side walls 2 which slope inwardly to a base 3 of the container, and has a diffusion barrier 4 extending over the entirety of its external surface formed by a blank of a plastics film material which is incorporated into the container as it is moulded. The plastics film may be a co-extruded multi-layer film of known kind or it may be a mono-layer film.

Figure 1:
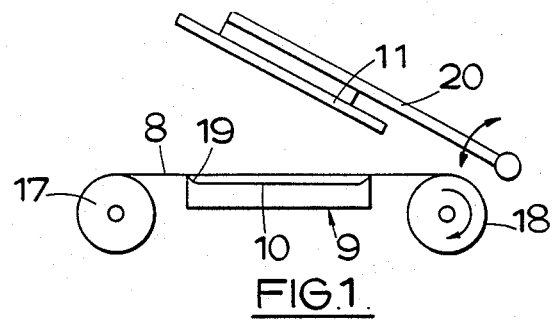
FIG. 1 is a diagrammatic side view of cutting means used in a process in accordance with the present invention.
Figure 3:
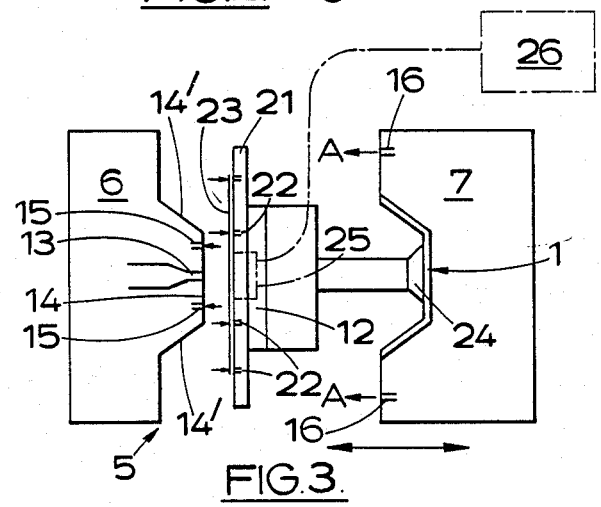
FIG. 3 is a diagrammatic plan view of a mould used in the process, being shown in an open position with a moulded plastics article about to be removed after a moulding operation, and a blank being introduced into the mould for a subsequent moulding operation.

Used in the process are an injection mould 5, FIG. 3, comprising a stationary male mould half 6 and a movable female mould half 7 which together define a cavity of the shape of the container to be moulded, a strip 8 of the plastics film material, cutting means 9, FIG. 1, which comprises a die 10 and a pressure pad 11, and a transfer arm 12.

The male mould half 6 of the mould 5 has an injection orifice 13 through which in a moulding operation liquified plastics material is injected into the cavity of the mould centrally of a central portion 14 of the mould half which defines an inner face of the base 3 of the container to be formed. Sloping side portions 14' of the male mould half extending away from the central portion 14 define inner faces of the side walls 2 of the container. Spaced around the injection orifice 13 at the central portion 14 of the male mould half are ports 15 at which suction is applied when the mould is open. The female mould half 7 has ports 16 for air to be blown towards the male mould half, as indicated by arrows A in FIG. 3, when the mould is open.

The strip 8 of the plastics film material is loaded on a supply reel 17, FIG. 1, and is wound off that reel on to a receiving reel 18. The receiving reel 18 is rotated intermittently. Each time that the reel is rotated a sufficient amount of the strip is drawn from the supply reel 17, with the assistance of feed rollers if necessary, for a blank to be cut from the strip. Between the supply and receiving reels the strip 8 extends horizontally over the die 10 of the cutting means which is horizontally movable between a cutting position at which it is directly below the strip 8 and a transfer position in which it is disposed to one side of the strip. The die 10 is in the form of a tray which has the shape of a blank to be cut from the strip, and which has an up-turned continuous peripheral wall the lip of which provides a cutting edge 19 of the die. The pressure pad 11 is flat, and larger than the die 10 and is carried by a pivoted arm 20 by which the pressure pad is moved between a horizontal operative position in which it overlies and presses down on the strip on the die to cause the cutting edge 19 to cut a blank out of the strip, and a raised inoperative position. The transfer arm 12 is angularly movable between a horizontal position immediately above the transfer position of the die 10, at which position it picks up a cut blank from the die, and a raised vertical position between the male and female mould halves of the open mould, directly opposite the male mould half 6, for the blank it has picked up to be received into the mould. It includes a carrier 21 which, like the pressure pad, is flat and larger than the die 10. There are ports 22 in the carrier 21 at which suction is applied to pick up the blank from the die and hold the blank as it is taken to the mould.

Figure 2:
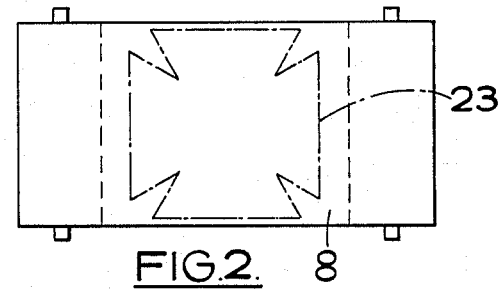
FIG. 2 is a diagrammatic plan view of a strip of plastics film material indicating the shape of a blank to be cut from the film.

The blanks to be cut from the plastics film strip are of a Maltese cross shape, as indicated at 23 in FIG. 2. The size and shape of each blank 23 is such that a central part of the blank is able to extend across the full area of the external surface of the base 3 of the container in which it is to be incorporated, and each of the four flaring arms of the blank is able to extend across the full area of the external surface of a respective side wall 2 of the container and to meet, at its opposite diverging sides, the adjacent sides of adjoining arms along the corners of the container.

The transfer arm 12 also carries a pick-up head 24 which operates to remove completed containers from the opened mould after moulding operations, whilst the blanks are being located in the mould. The pick-up head 24 engages with a container to be removed and applies suction to the container to hold it for removal from the mould. The container is delivered by the pick-up head to a stack for subsequent collection.

Rotation of the receiving reel 18, and/or feed rollers, to draw the strip 8 across the die, movement of the die between the two positions, operation of the pressure pad and of the transfer arm, and the application of suction at the carrier 21, at the pick-up head 24 and at the male mould half 6, and blowing of air from the ports 16 in the female mould half 7, are all automatically controlled and co-ordinated with operation of the mould, as by a microprocessor.

An operating cycle in the application of the process will now be described. Firstly a blank is cut from the strip 8 by the pressing of the pressure pad 11 on the strip over the die 10. The cut blank is held by the die which then moves to the transfer position. Surplus material left in the strip after the blank has been cut out is wound on to the receiving reel 18 when that reel is next rotated. As the mound is opening, the blank is picked up by the carrier 21 of the transfer arm 12 and moved angularly to its raised position, and the carrier is brought into position between the male and female mould halves such that the blank is directly opposite the male mould half 6, as shown in FIG. 3. Suction at the carrier 21 then ceases and simultaneously suction is applied at the ports 15 in the male mould half to draw the central part of the blank on to the central portion 14 of that mould half. With the blank thus held on the male mould half, the transfer arm 12 is returned to its horizontal position ready for the carrier to pick up the next blank to be cut from the strip 8. As the transfer arm is moving to the horizontal position the female mould half 7 is closing towards the male mould half and as it does so air is blown from the ports 16 which causes the arm parts of the blank to lie flat against the side portions 14' of the male mould half.

When the mould is closed liquified plastics material is injected into the cavity through the injection orifice 13. The liquified plastics material forces the blank against the part of the cavity defined in the female mould half as it fills the cavity between the blank and the part of the cavity defined in the male mould half. As the plastics material solidifies the blank becomes bonded to the material to the extent that it is substantially integral with the material in the moulded container 1 that is produced, and it covers the entire external surface of the container at the base and side walls. As soon as the plastics material has solidified the mould is opened, the container 1 is separated from the male mould half in known manner by a stripper plate, not shown, on that mould half and moves with the female mould half away from the male mould half. The container is removed from the female mould half by the pick-up head 24, FIG. 3, when the transfer arm 12 is subsequently moved to its raised position to position the blank for the next moulding operation in the mould. The cycle is thus completed.

It will be appreciated from the foregoing that each blank is positively held as it is cut from the strip and transferred to the mould, and its location in the mould is fully controlled so that correct positioning of the blank for incorporation into a container is assured.

As the arms of the blank incorporated in a container meet at the corners of the container the diffusion barrier 4 formed by the blank is complete. The correct location of the blank in the mould ensures that there are neat joins between the arms of the blank at the corners of the moulded container. The bonding of the blank to the plastics material is normally such that the container may be washed, and even sterilised, with little likelihood of the blank becoming detached.

A moulded plastics lid may be made for the container in which a blank is incorporated in a similar manner as a label and/or diffusion barrier.

In a modification, instead of suction being applied at the male mould half to draw a blank on to that mould half from the transfer arm, static electricity is used to cause a blank to be attached to the male mould half and to be located in position for the subsequent moulding operation. For this purpose the transfer arm 12 carries a charging electrode 25, as indicated by broken lines in FIG. 3, which is connected to a generator 26 for applying an electrostatic charge to the cut blanks carried by the transfer arm to the mould. The generator 26 is operated automatically to activate the charging electrode 25 as the suction applied to a blank at the arm is removed to release the blank. Typically a charge of 10,000 volts is applied to the blank for approximately 0.25 secs. In the manufacture of an open-topped container as described the electrostatic charge is applied centrally to the central part of the blank. The charge initially causes that part of the blank to be attracted to the central portion 14 of the male mould half 6, and as its effect spreads across the blank the arm parts of the blank are attracted to and held against the side portions 14' of the male mould half. The blank is securely held on the male mould half as the mould is closed, so as to be correctly located in the mould cavity. As before, as liquified plastics material is injected into the mould cavity from the injection surface 13 in the male mould half 6 it lifts the blank away from the surface of the male mould half and forces it against the cavity-defining surface of the female mould half 7, so that the blank will be at the external surface of the moulded container.

When using some plastics materials for the blanks there may be a risk that in the moulding operation the portions of the blanks directly adjacent to the injection orifice in the mould may be damaged and break down under the heat to which they are subjected by the injected plastics material as it enters the mould. Such damage would be undesirable when the blanks are to provide a diffusion barrier. The problem may be avoided by providing protective patches on those portions of the blanks which will be adjacent to the injection orifice when the blanks are located in the mould, so that the patches will be exposed to the injected plastics material and protect the said portions of the blank from direct contact with the plastics material. The patches may, for example, be of paper or plastics sheet material which may be adhesively secured on the blanks, the patches conveniently being coated with self-adhesive on a surface for that purpose.

In the manufacture of a container as described, and using a blank having a protective patch, which will be applied at the middle of the central part of the blank at the side of the blank which is exposed to the injection orifice 13 in the mould 5, it will be understood that in the moulded container the patch will be sandwiched between the blank and the injected plastics material. The patch, like the blank, becomes bonded to the plastics material.

In the process described the protective patches may be applied to the blanks after the blanks have been cut from the strip 8 and moved to the transfer portion on the die 10, so that the patches are on the blanks before the blanks are picked up by the carrier 21 of the transfer arm 12. The patches may be applied automatically, their application being synchronized with the positioning of the die. As an alternative, the patches may be applied to the strip 8 before the blanks are cut out.

We claim:

1. A method of manufacturing a moulded plastics article having a blank of a flimsy plastic film material applied at a surface thereof as said article is moulded in a mould, including the steps of feeding a strip of said plastics film material to cutting means and cutting said blank from said strip, said cutting means comprising a die component having a cutting edge defining the required shape of said blank and a flat pad component of larger size than said blank, which said components are relatively movable to bear on opposite side surfaces of said strip and cause said die component to cut out said blank from said strip, supporting said blank by one of said components and moving said one of said components and said blank to a positive spaced from said strip, collecting said blank from said one component at said position and feeding it to said mould by transfer means comprising a carrier having a flat surface larger than said blank at which suction is applied to pick up said blank from said one component and hold it flat against said surface, moving said carrier into a position between separated relatively movable halves of said mould, removing said suction from said surface when said carrier is in said position and simultaneously causing said blank to be urged perpendicularly away from said surface and located on an adjacent surface of one of said mould halves, withdrawing said carrier from said position, subsequently closing said mould halves together for the respective moulding operation to be performed, and moulding plastic in said plastics article.

2. A method according to claim 1 in which said die component supports said blank as it is cut from said strip, and said die component is movable between a cutting position at which it bears on one of said opposite side surfaces of said strip, and a transfer position in which it is spaced from said strip and to which it takes said supported blank to be picked up by said transfer means to be transferred to said mould.

3. A method according to claim 1 in which said strip is stored on a first reel from which it is fed to said cutting means, and surplus material in said strip left after said blank has been cut therefrom is wound on to a second reel after said cutting step for disposal.

4. A method according to claim 1 in which successive cutting steps are each performed whilst said mould halves are closed together for a moulding operation to be performed to produce a moulded article incorporating said blank cut from said strip in an immediately preceding cutting step.

5. A method according to claim 1 in which said carrier moves into said position as said movable halves are separating to open said mould.

6. A method according to claim 1 in which said transfer means includes pick-up means movable with said carrier and which when said relatively movable halves of said mould are separated is operative to remove a moulded article from one of said mould halves after a moulding operation whilst a blank for a next moulding operation is being located in the other one of said mould halves.

7. A method according to claim 1 in which suction is applied at said adjacent surface of said one mould half to draw said blank away from said carrier surface and locate said blank on said adjacent surface.

8. A method according to claim 1 in which said blank is caused to be electrostatically charged when said carrier is in said position and said suction at said carrier surface is removed and said blank is attracted by said electrostatic charge on to said adjacent surface of said one mould half.

9. A method according to claim 8 in which said transfer means carries a charging electrode which applies said electrostatic charge to said blank on said carrier surface.

10. A method according to claim 1 in which said blank has a protective patch applied to it at a position thereof which when said blank is located on said adjacent surface of said one mould half and said mould halves are closed together is adjacent to an entry for moulding plastics material into said mould, thereby to protect said portion from direct contact with said moulding plastics material as it enters said mould in the respective moulding operation.

* * * * *